Figure 1:
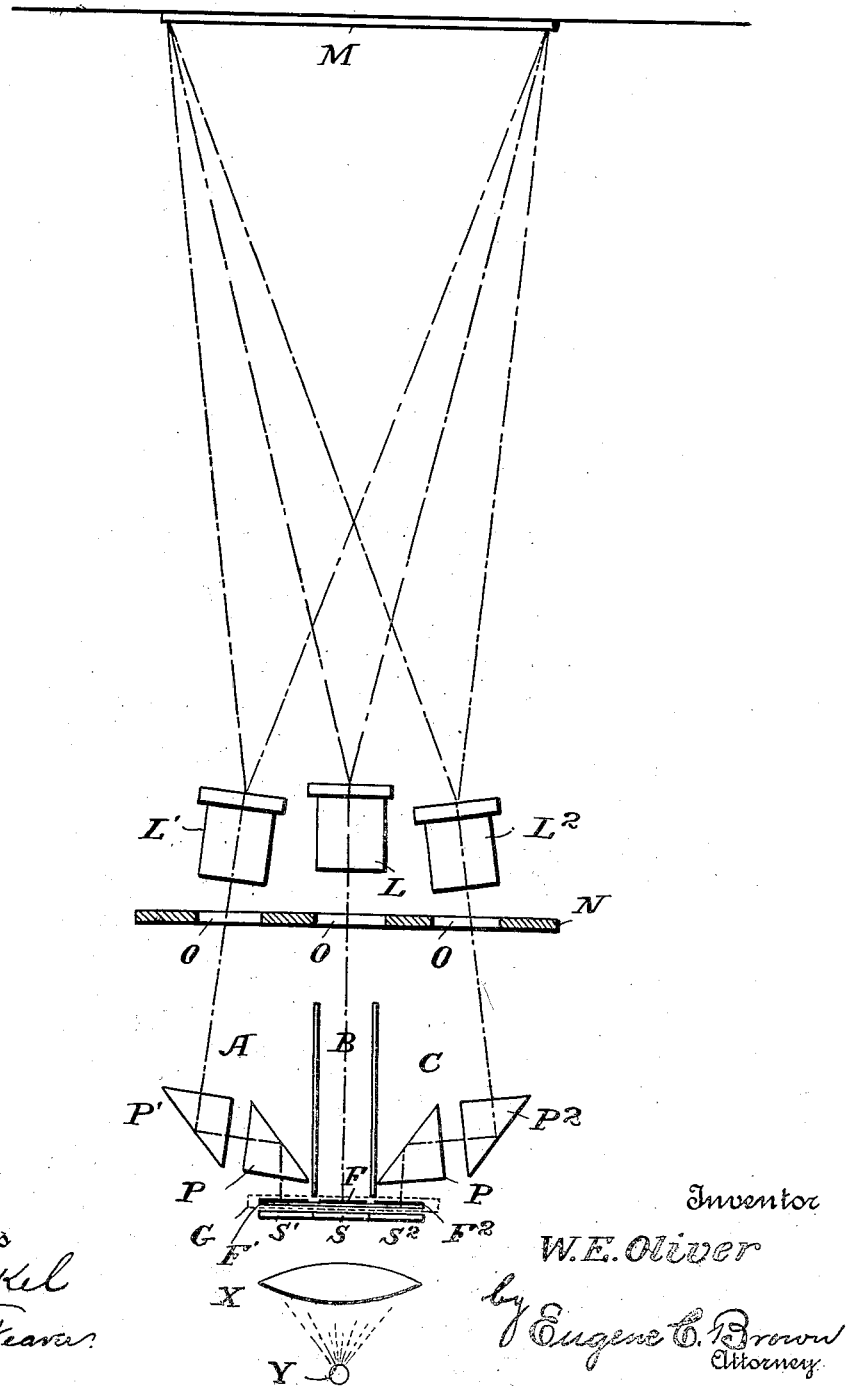

W. E. OLIVER.
ART OF EXHIBITING MOTION PICTURES IN NATURAL COLORS.
APPLICATION FILED MAR. 15, 1909.

973,961.

Patented Oct. 25, 1910.
2 SHEETS—SHEET 1.

W. E. OLIVER.
ART OF EXHIBITING MOTION PICTURES IN NATURAL COLORS.
APPLICATION FILED MAR. 15, 1909.
973,961.
Patented Oct. 25, 1910.
2 SHEETS—SHEET 2.
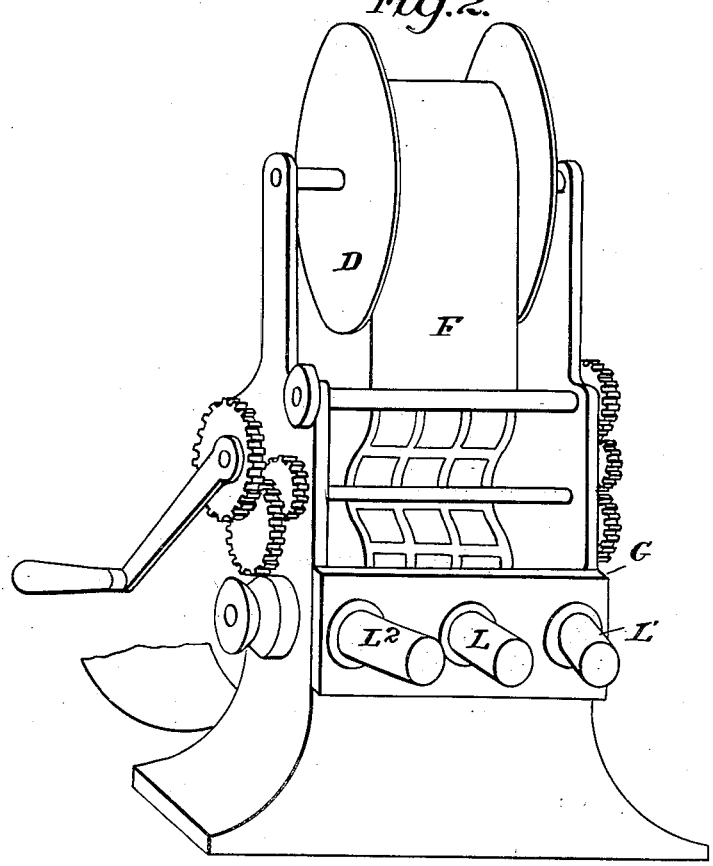
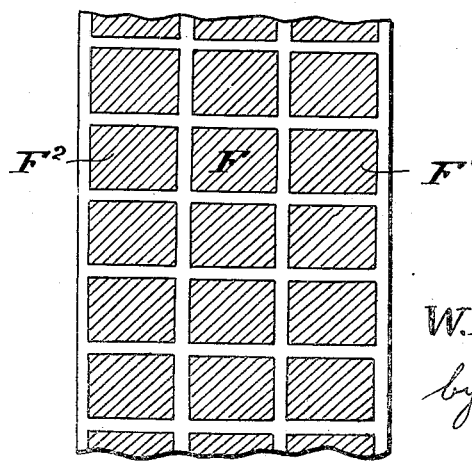
Witnesses
J. G. Hinkel
E. E. Weaver
Inventor
W. E. Oliver
by Eugene C. Brown
Attorney

UNITED STATES PATENT OFFICE.

WILLIAM E. OLIVER, OF WASHINGTON, DISTRICT OF COLUMBIA, ASSIGNOR TO THE OLIVER TRI-CHROMATIC COMPANY, OF WASHINGTON, DISTRICT OF COLUMBIA, A CORPORATION OF VIRGINIA.

ART OF EXHIBITING MOTION-PICTURES IN NATURAL COLORS.

973,961.      Specification of Letters Patent.      Patented Oct. 25, 1910.

Application filed March 15, 1909. Serial No. 483,530.

*To all whom it may concern:*

Be it known that I, WILLIAM E. OLIVER, a citizen of the United States, and a resident of Washington, District of Columbia, have invented a new and useful Art of Exhibiting Motion-Pictures in Natural Colors, of which the following is a specification.

Heretofore in the display upon a curtain screen for public exhibition of a succession of photographic images from negatives taken in rapid succession to produce what is known as moving pictures or kinetescopic effects, use was made of a single film of indefinite length embodying a succession of single views running into thousands, each of which showed a progressive movement of the object or scene depicted, the succession of such views or images producing in accordance with the well known principle of persistence of vision, the appearance of actual motion. Such views are commercially in black and white only. The reason for this is the great expense incurred in coloring the thousands of views on the tape or film and the practical impossibility of getting the colors on each view exactly alike. It has been common in color photography to use three positive plates, and by three lenses to throw each image of each plate through glass screens of the three primary colors, red, yellow, and blue, and by assembling the three images in perfect registration on a curtain screen to produce a composite view in natural colors. It is essential that the superimposition of the three images on the curtain screen be absolutely perfect for unless there is perfect coincidence or registration the picture will be a failure. So it is that the placing of views on separate tapes or films has failed since intermittent movement of each in coextensive and synchronous intervals is practically impossible.

My present invention is designed to overcome these difficulties and by the synthesis of the three color images to secure precise and synchronous and coextensive movement of the three views of each composite image, so as to produce moving pictures in natural colors without the expense of coloring the tape or film and without the embarrassment and difficulty attendant on the use of three detached tapes or films.

My invention therefore consists in the art of projecting motion pictures upon a display screen in natural colors, by simultaneously taking, by the well known three color process, three negatives of each pose of the picture and placing the three images side by side on one and the same tape or film in transverse position across the same, then providing a separate color screen for each image and projecting the views through their respective color screens in perfect registration on the display screen or curtain. The placing of the three images on a single tape or film insures absolute synchronism of movement, coextensive movement, and coextensive intervals of movement for the three alined images so that a perfect composite picture is presented on the curtain. The projecting apparatus, the tape or film and the camera for producing the three-colored photographic records on said tape or film are more specifically described and claimed in other applications.

The characteristic features and scope of the invention will be more clearly understood by reference to the accompanying drawings, forming a part hereof, wherein—

Figure 1, is a diagrammatic view showing the general arrangement of the lenses, screens and prisms. Fig. 2, is an elevational view of the projecting apparatus showing more particularly the relation of the tri-colored film and the lenses; and Fig. 3, illustrates the film.

Referring to the drawings, L, L', L², indicate the lenses, whereof the last two are adjusted by any suitable means (not shown) for minute angular adjustment. The prisms P, P', P², are under like control.

N, indicates an appropriate shutter with openings O, which are opened and closed in any suitable manner.

G, indicates the gate or window at which the film or tape F, pauses at the moment the openings O, in the shutter are opened.

Y, indicates a source of light that illuminates the photographic images, X, the condenser, and S, S', and S², are the color screens which filter the light from the condenser before it passes through the film.

M, indicates the display field or screen which presents the picture in natural colors.

By adjusting the reflected prisms P, P', P², upon their axes, the light rays which are diverged and reflected may be directed into line, with the optical axes of the lenses L', and L², after these have been adjusted to accurately superpose the three images upon the screen, which is, of course, essential in producing a unitary composite picture. It will be appreciated by those skilled in the art, that the focal distances between each of the images, F, F', F², of the film and the three lenses must be the same in order that the three pictures shall be in focus upon the screen simultaneously and in order that the images shall be identical in dimensions so that they may be accurately superposed, these features being absolutely essential to the production of a single composite picture and the synthesis of the three colors. I am enabled to accomplish these ends by diverging the light rays of the colors upon either side of the central color, between the film and the lens, so that the central lens may be placed at a slightly greater distance from the film than the side lenses, the paths of the light from the film to the three lenses being thereby made equal. This also provides for equal illumination of the three images since it is essential that the path of light from the condensing lens X to each of the lenses shall be uniform in order that the maximum light may be focused upon each lens to obtain the full illumination, the position of the light source Y being changed with each change in the focus.

The colors employed are the three primary colors, red, yellow, and blue, the red screen S, being located in the center or middle compartment B, with the complemental yellow and blue screens, S', and S², on either side thereof or respectively in the compartments A, and C. In my practical investigation of this subject, I have found that it is essential that the red rays should be transmitted and projected without deviation from the source, because of the much lower rate of wave-vibration of the red compared with the wave-vibrations of the other colors employed. The blue and yellow or green rays which have a higher rate of vibration and greater persistence may be diverged out of the original path from the source of light and then projected by the transmitting lens without material loss of light intensity. That is, by transmitting the red color of slower vibration directly through the central lens and reflecting the other two colors having higher rates of vibration, and which are more nearly alike in wave vibration, I am enabled to secure a nearly perfect synthesis of colors. The prisms transmit the light rays passing through their respective color screens and diverge them in a manner to bring them into axial alinement with the lenses L' and L². They also serve to restore the position of the images and secure absolute correspondence in the fields of all the lenses.

The reflecting prisms which are employed to diverge the rays of the two outside colors are placed intermediate the picture film and the lenses and closely adjacent the film in order that they may receive the fullest illumination from the light issuing from the condensing lens, the intensity of the light diminishing with the square of the distance. The prisms receive the incident parallel rays extending across the entire image of the film. The light rays are then focused in the lens and project a sharp and distinct image directly upon the screen with the full illumination of the lens.

Traveling vertically between the prisms and color screens is the tape or film, which as indicated in Fig. 3, has disposed transversely thereof three photographic records F, F', F², of each pose of the scene depicted, which three records are side by side and are repeated along the length of the film in successive poses. The film and the special camera for taking the views, are, as before stated, the subjects of other applications of mine. For the present application it will be sufficient to say that the film is a triple view film, but the views are all integral so far as the body of the film is concerned, that is to say the film is three times the width of the usual film and has three views, made in accordance with the well known three-color process, of each pose, in a transverse plane thereof, the three views being repeated in unlimited succession in depicting the complete scene of the moving picture. As shown in Fig. 1, each view or image has its proper color screen and the several images fall on the display screen or curtain M, in perfect coincidence to form a single composite picture in which the natural colors appear in accordance with the well known three color process.

To impart the necessary movement to the film it is carried on a spool or reel D, as seen in Fig. 2, and after passing the shutter is received on another reel or spool below. Intermittent motion is provided so as to hold the three images the longest possible time in the line of projection, and for this purpose any well known means may be employed.

With a film made as described, and operated by the three color projecting apparatus, it will be seen that the three primary colors when superimposed on a single field in perfect registration reproduce in natural colors the scene depicted. Perfect registration is assured because the separate color views being on one and the same film move synchronously and coextensively.

Having described the nature and objects of the invention I claim:

1. The art of displaying motion pictures in natural colors, which consists in projecting from a single film through complemental color screens a plurality of photographic records or images, diverging in opposite directions the light rays of the two colors having the higher wave-vibrations, maintaining equal focal distances in the paths of the several light rays, and projecting the rays of the three colors through optical media directly upon a screen or curtain.

2. The art of displaying motion pictures in natural colors, which consists in superimposing on an identical field photographic records or images in the three primary colors, said images being projected from a film having a series of like views extending transversely thereof with the red rays in the center, the light rays from the other two colors being diverged from their original paths in opposite directions, and the rays of the three colors, having paths of equal focal distance, and being projected directly upon a curtain or screen through optical media.

3. The art of displaying motion pictures in natural colors, which consists in forming on a single film a plurality of transversely ranging views of each pose of the picture and projecting them synchronously and coextensively through their proper corresponding color screens in equal focal relations and directly through an optic medium upon an identical field.

4. The art of exhibiting motion pictures in natural colors, which consists in forming three like images of each pose of the object or scene to be reproduced, and projecting them through complemental color screens with the red rays in the center, diverging the rays of the other two colors in opposite directions, and then converging them in a manner to coincide with the said red rays upon a screen while maintaining equal focal distances in the paths of three colors, and projecting the rays of the three colors directly upon the screen through optical media.

5. The art of exhibiting motion pictures in natural colors, which consists in forming in transverse alinement and in the three primary color values three like images of each pose of the object or scene to be reproduced, and projecting them through complemental color screens with the red rays in the middle, diverging the rays of the other two colors in opposite directions, and then converging them in a manner to coincide with the said red rays upon a screen, maintaining equal focal distances for the light rays of the three colors, and projecting the rays of the three colors directly upon the screen through optical media.

In testimony whereof I have hereunto signed my name in the presence of two subscribing witnesses.

WILLIAM E. OLIVER.

Witnesses:
 JAS. A. RICHMOND,
 A. F. WILLIAMS.